(12) United States Patent
Brocke

(10) Patent No.: US 7,565,771 B2
(45) Date of Patent: Jul. 28, 2009

(54) SEALING ARRANGEMENT, ESPECIALLY FOR SEALING WINDOW PANES OF MOTOR VEHICLE

(75) Inventor: Rolf Brocke, Wangen (DE)

(73) Assignee: Metzeler Automotive Profile Systems, GmbH, Lindau/Bodensee (DE)

( * ) Notice: Subject to any disclaimer, the term of this patent is extended or adjusted under 35 U.S.C. 154(b) by 471 days.

(21) Appl. No.: 10/539,689

(22) PCT Filed: Dec. 16, 2003

(86) PCT No.: PCT/EP03/14341

§ 371 (c)(1),
(2), (4) Date: Feb. 21, 2006

(87) PCT Pub. No.: WO2004/056598

PCT Pub. Date: Jul. 8, 2004

(65) Prior Publication Data

US 2008/0012242 A1  Jan. 17, 2008

(30) Foreign Application Priority Data

Dec. 19, 2002  (DE) ............................... 102 59 843

(51) Int. Cl.
B60J 1/16  (2006.01)
(52) U.S. Cl. ........................................................ 49/377
(58) Field of Classification Search ................... 49/374, 49/377, 495.1
See application file for complete search history.

(56) References Cited

U.S. PATENT DOCUMENTS 3,742,649 A * 7/1973 Dochnahl .................... 49/441

4,291,076 A  9/1981 Katoh (Continued)

FOREIGN PATENT DOCUMENTS

DE  2018864  11/1971

(Continued)

*Primary Examiner*—Jerry Redman
(74) *Attorney, Agent, or Firm*—Stephen B. Salai, Esq.; Brian B. Shaw, Esq.; Harter Secrest & Emery LLP

(57) ABSTRACT

Disclosed is a sealing arrangement, especially for sealing window panes (13) of a motor vehicle (10), comprising a weatherstrip (20) that is provided with a sealing section (21) and a fastening section (22), and a trim (40) which is connected in a non-positive manner to the fastener section (22). Said fastener section (22) encompasses a retaining segment (23) which can be pivoted from a first position (I) into a second position (II) so as to fasten the trim strip (40). In order to obtain a flat embodiment of the trim (40) and be able to reliably fix the trim strip (40) to the weatherstrip (20) while using relatively little mounting force, one end of said trim strip (40) is provided with a first hook section (41) while the other end thereof is provided with a second hook section (42). The second hook section (42) rests in a non-positive manner against the retaining segment (23) while the first hook section (41) catches on a first contact area (24) of the fastening section (22). The retaining segment (23) can be pivoted from the first position (I) into the second position (II) counter to the effect of a restoring force in order to engage the first hook section (41) on the first contact surface contact area (24).

24 Claims, 5 Drawing Sheets

U.S. PATENT DOCUMENTS

| | | | |
|---|---|---|---|
| 5,799,442 A * | 9/1998 | Takahashi et al. | 49/377 |
| 6,141,854 A * | 11/2000 | Mueller et al. | 29/450 |
| 6,260,254 B1 * | 7/2001 | Mueller et al. | 29/450 |
| 6,409,251 B1 * | 6/2002 | Kaye et al. | 296/146.9 |
| 6,668,490 B2 * | 12/2003 | Hock et al. | 49/502 |
| 6,679,003 B2 * | 1/2004 | Nozaki et al. | 49/441 |
| 6,681,526 B2 * | 1/2004 | Mueller et al. | 49/440 |
| 6,742,304 B1 * | 6/2004 | Mueller et al. | 49/377 |
| 7,171,785 B1 * | 2/2007 | Kelly et al. | 49/377 |
| 2005/0235569 A1 * | 10/2005 | Shumulinskiy | 49/377 |
| 2006/0168892 A1 * | 8/2006 | Dohles et al. | 49/374 |

FOREIGN PATENT DOCUMENTS

| | | |
|---|---|---|
| DE | 22 28 061 A | 12/1973 |
| DE | 34 26 355 A1 | 2/1985 |
| DE | 197 36 899 C2 | 3/1999 |
| DE | 697 03 241 T2 | 5/2001 |
| GB | 2 024 906 A | 1/1980 |
| WO | WO2004/056598 A1 | 12/2003 |

* cited by examiner

SEALING ARRANGEMENT, ESPECIALLY FOR SEALING WINDOW PANES OF MOTOR VEHICLE

FIELD OF THE INVENTION

The invention relates to a sealing arrangement or weatherstrip assembly which particularly serves to seal the window panes of a motor vehicle. The weatherstrip assembly is provided with a weatherstrip comprising a sealing section and a fastener section, and a trim strip positively connected to the fastener section. The fastener section comprises a retaining segment which is pivotable from a first position to a second position for fastening.

BACKGROUND ART

A weatherstrip assembly for sealing window panes of a motor vehicle reads from DE 34 26 355 A1. This known weatherstrip assembly comprises a weatherstrip co-extruded of several elastically deformable materials and which is secured to a body flange of the motor vehicle. At an outer surface area the weatherstrip is positively connected to a cover strip. For this purpose the cover strip features a protuberance engaging a slot in the weatherstrip. Experience has shown that the drawback of this known weatherstrip assembly is that a relatively high force is needed to urge the protuberance into the slot.

Disclosed furthermore in DE 1 97 36 899 C2 is a weatherstrip assembly comprising an elastomer weatherstrip for sealing a window pane of a motor vehicle. The weatherstrip is positively connected to a trim strip which for this purpose is provided with a retaining section in the form of a protuberance. When securing the weatherstrip to a body flange of the motor vehicle the retaining section is enclosed by a retaining segment pivotably configured on the weatherstrip. Although an effective positive connection between trim strip and weatherstrip is achieved by the pivotable arrangement of the retaining segment without necessitating a relatively high fitting force, the drawback in this weatherstrip assembly is the relatively bulky profile configuration of the trim strip. The reason for this is the retaining segment sticking out nearly orthogonally from the trim strip.

A weatherstrip provided with a trim strip reads further from DT 2 018 864 A. This weatherstrip is provided with two retaining ribs facing outwardly, each of which forms an insertion groove. These insertion grooves serve to receive edges of the trim strip bending more than 90° which positively connects the trim strip to the weatherstrip.

Known in addition from DE 697 03 241 T2 is a weatherstrip for the cavity in the door of a motor vehicle featuring a trim strip at an outer surface area. At an upper end this trim strip engages a recess in the weatherstrip whilst at a lower end it contacts a widened end section of the weatherstrip.

The invention is based on the objective of improving a weatherstrip assembly of the aforementioned kind such that for a relatively low fitting force a low-profile configuration of the trim strip with satisfactory fastening of the trim strip to the weatherstrip is now achievable.

A weatherstrip assembly having the features as cited at the outset in accordance with the invention has a trim strip provided at one end with a first hook section and at the other end with a second hook section. The second hook section is in positive contact with the retaining segment, whereas the first hook section latches to a first contact surface area of the fastener section. The retaining segment can be pivoted from the first position into the second position to counteract the effect of a restoring force when latching the first hook section to the first contact surface area.

The weatherstrip assembly in accordance with the invention is the result of having discovered it now being possible to achieve a simple and reliable fastening of the trim strip to the weatherstrip by the retaining segment being elastically deformable in overcoming the effect of a restoring force. The retaining segment for pivoting from the first position into the second position when fitting the trim strip ensures latching of the first hook section to the first contact surface area requiring no high fitting force. Due to the restoring force inherent to the retaining segment the retaining segment returns to the first position in the latched condition of the first hook section in thus ensuring an effective positive connection between the hook sections of the trim strip and the weatherstrip. At the same time, a non-positive connection of trim strip and weatherstrip materializes which contributes towards compensating fabrication tolerances. The hook sections producing a relatively high withdrawal force permit in addition a low-profile configuration of the trim strip, for the retaining sections as sticking out from the trim strip in prior art are now eliminated by the hook sections.

It is of advantage when the fastener section is provided with a recess adjoining the retaining segment. The recess permits pivoting the retaining segment from the first position into the second position so that the retaining segment can be arranged within a practically closed contour of the fastener section, resulting in a compact design.

Preferably, the retaining segment forms a second contact surface area opposite the recess for the trim strip to ensure an effective positive connection. The second contact surface area in this arrangement is configured expediently curved and is preferably formed by a recess in the fastener section. Curving the second contact surface area in this way contributes towards the second hook section snagging the second contact surface area so as to produce a satisfactory positive connection. Forming the second contact surface area by a recess in the fastener section contributes towards arranging the retaining segment within a closed contour of the fitted condition as regards a compact configuration.

It is furthermore of advantage to form the first contact surface area by a recess in the fastener section to render the first contact surface area relatively hard wearing, producing an effective positive connection.

In one preferred embodiment of the weatherstrip assembly in accordance with the invention the fastener section is provided with at least one supporting lip for supporting the trim strip. The supporting lip expediently disposed between the first contact surface area and the second contact surface area produces a tensioning force which urges the hook sections of the trim strip against the first and second contact surface areas. The non-positive connection produced by the restoring force of the retaining segment between the trim strip and weatherstrip is enhanced by the tensioning force so that a relatively high withdrawal force is taken into account. Apart from this, the supporting lip facilitates interlatching of the hook sections of the trim strip and each of the contact surface areas of the weatherstrip since the tensioning force produced by the supporting lip permits a relatively high fabrication tolerance.

Advantageously, the weatherstrip assembly in accordance with the invention includes a body part to which the fastener section is secured, the fastener section preferably having an approximately U-shaped cross-section for mounting on a flange of the body part in ensuring practical fitting.

The fastener section is preferably strengthened by a preferably metallic carrier which ensures adequate rigidity of the fastener section in thus contributing towards a satisfactory fastening.

The trim strip is expediently made of plastics or metal, preferably of aluminum. Particularly configuring the trim strip in aluminum achieves to advantage not only a lightweight configuration, but also a design of enhanced visual appeal.

For facilitated cost-effective fabrication the weatherstrip is preferably extruded from an elastomer, preferably a thermoplastic elastomer (TPE) or ethylene propylene diene monomer (EPDM). Fabricating the weatherstrip by extrusion is in keeping with mass production requirements as especially pertinent to automotive production.

BRIEF DESCRIPTION OF THE DRAWINGS

Details and further advantages of the weatherstrip assembly in accordance with the invention read from the following description of preferred example embodiments as merely shown diagrammatically in the corresponding drawings in which.

DETAILED DESCRIPTION OF THE INVENTION

Figure 1:
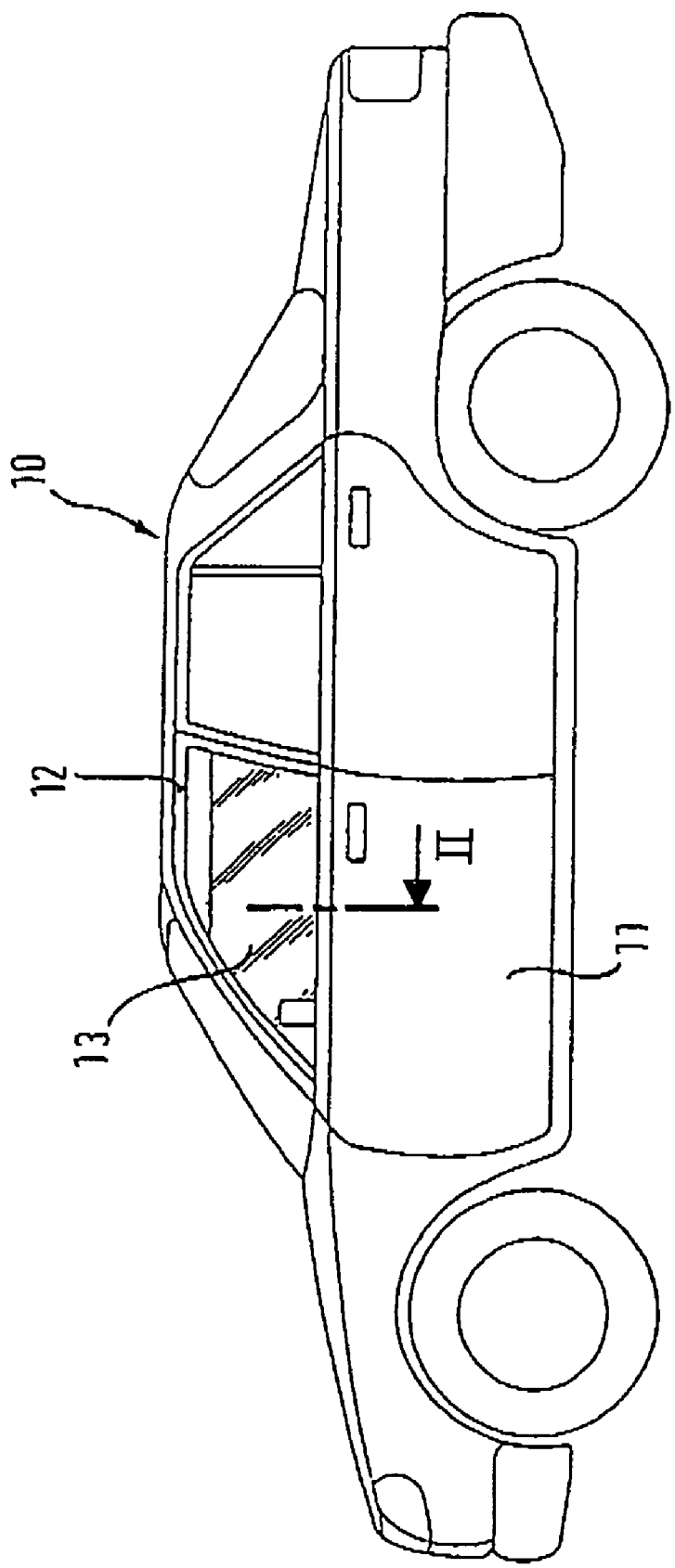
FIG. 1 is a side view of a motor vehicle

Referring now to FIG. 1 there is illustrated a motor vehicle 10 provided with a door 11 comprising a frame 12. Arranged within the frame 12 is a powered window pane 13. The window pane 13 is sealed by a weatherstrip 20 comprising a sealing section 21 and a fastener section 22, as evident from FIGS. 2 and 3. The fastener section 22 is secured to a flange 14 of the door 11. For this purpose the fastener section 22 comprises a recess 30 mounted on the flange 14. Arranged in the recess 30 are retaining lips 31 which connect the fastener section 22 additionally positively to the flange 14. The fastener section 22 is further strengthened in the region of the recess 30 by a carrier 32 made of plastics or metal. Cross-sectionally the carrier 32 is approximately U-shaped and serves to endow the fastener section 22 made of an elastomer, for example TPE, with adequate rigidity to ensure a satisfactory fastening to the flange 14.

Figure 2:
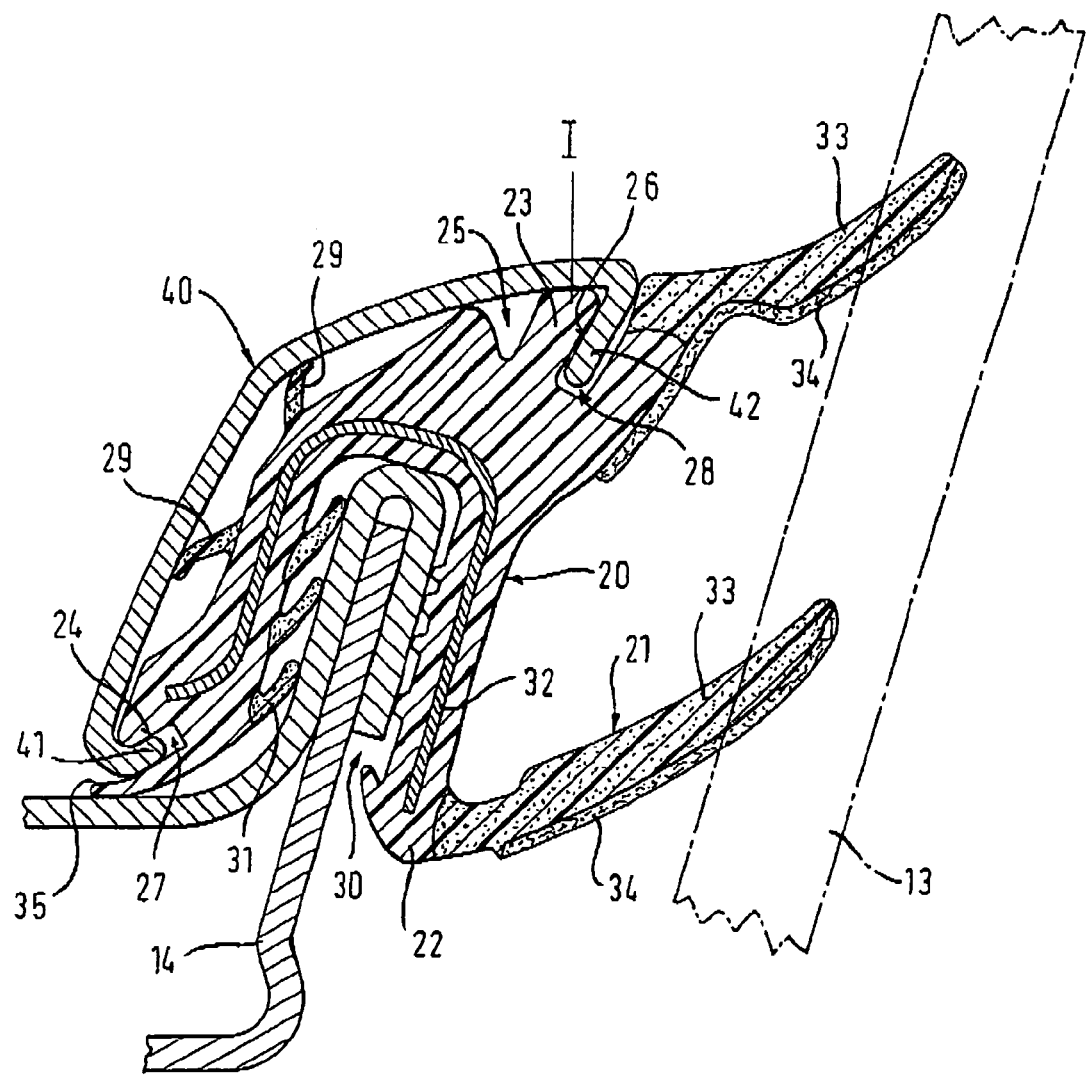
FIG. 2 is a cross-section as taken along the line II in FIG. 1 through a first embodiment of the weatherstrip assembly in accordance with the invention.
Figure 3:
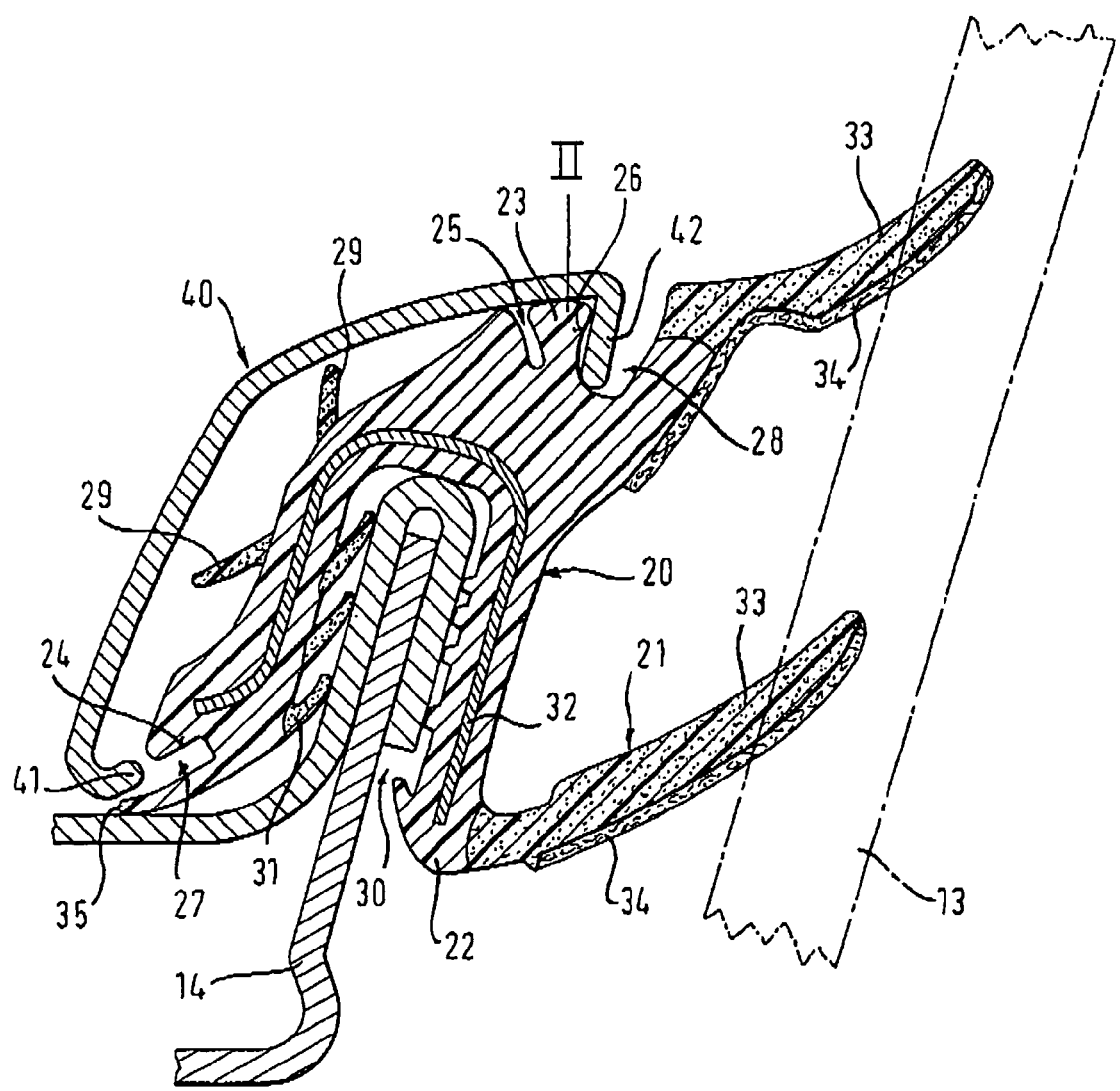
FIG. 3 is a cross-section as shown in FIG. 2 showing how a trim strip is fitted to a weatherstrip.

Referring now to FIGS. 2 and 3 there is illustrated in addition how the sealing section 21 fabricated by co-extrusion together with the fastener section 22 features sealing lips 33 in sealing contact with the window pane 13. The sealing lips 33 are provided with a flock coating 34 which reduces the friction when the window pane 13 is powered.

Arranged at an outer surface area of the weatherstrip 20 is a trim strip 40 made, for example, of aluminum. The trim strip 40 comprises at the one end a first hook section 41 and at the other end a second hook section 42. These hook sections 41, 42 are positively connected to the fastener section 22. For this purpose the fastener section 22 is provided with a retaining segment 23 which is pivotable from a first position I into a second position 11, again as evident from FIGS. 2 and 3. In the fitted condition of the trim strip 40 the first hook section 41 latches to a first contact surface area 24 of the fastener section 22, whereas the second hook section 42 positively connects a second contact surface area 26 of the retaining segment 23. The first contact surface area 24 and second contact surface area 26 are formed by recesses 27, 28 of the fastener section 22. In addition, adjoining the retaining segment 23, the fastener section 22 is provided with a recess 25 which is opposite the second contact surface area 26 in permitting pivoting of the retaining segment 23 from the first position I to the second position II.

To fit the trim strip 40 the second hook section 42 is inserted into the recess 28 in contact with the second contact surface area 26. Referring now to FIG. 3 there is illustrated how the retaining segment 23 is then pivoted against the effect of a restoring force from the first position I into the second position 11. The resulting displacement of the trim strip 40 enables the first hook section 41 to be introduced into the recess 27 in contacting the first contact surface area 24. Because of the restoring force the retaining segment 23 then returns from the second position 11 to the first position I resulting in the hook sections 41, 42 being connected to the contact surface areas 24, 26 both positively and non-positively. The non-positive connection materializing from the inherent restoring force of the retaining segment 23 is boosted by a tensioning force produced by the supporting lips 29 supporting the trim strip 40 between the first contact surface area 24 and second contact surface area 26. The tensioning force results from deformation of the supporting lips 29 occurring on latching of the first hook section 41 to the first contact surface area 24, as evident from FIG. 2. Contributing in addition towards a satisfactory fastening of the trim strip 40 to the weatherstrip 20 is a retaining lip 35 arranged in the region of the recess 27, as partly encloses the first hook section 41 when the fastener section 22 is mounted on the flange 14 in thus preventing the first hook section 41 from becoming detached from the first contact surface area 24. Apart from this, the retaining lip 35 prevents the trim strip 40 from contacting the flange 14 in enhancing the visual appeal in the transition from the trim strip 40 to flange 14. In addition, the elastically deformable retaining lip 35 ensures that fabrication tolerances are compensated in the transition from the trim strip 40 to flange 14.

Figure 4:
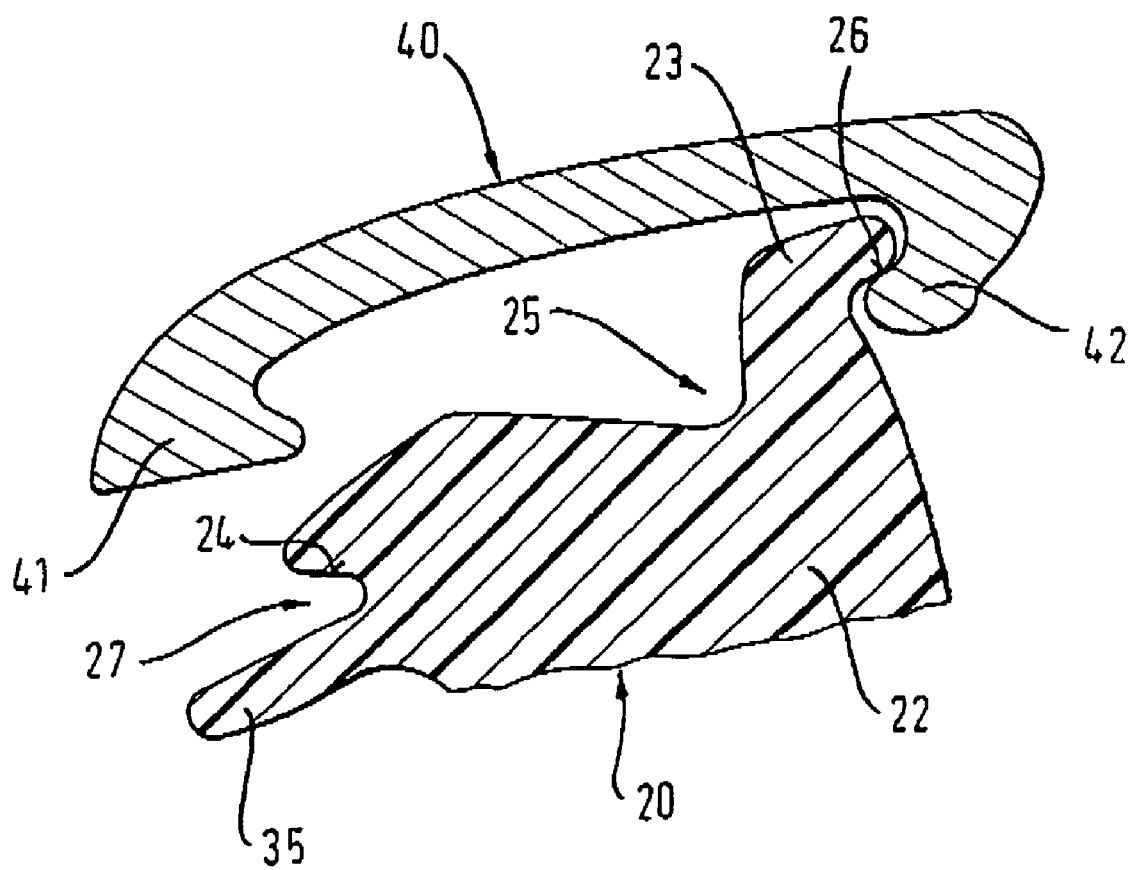
FIG. 4 is a cross-section through a second embodiment of a weatherstrip assembly in accordance with the invention.

Referring now to FIG. 4 there is illustrated an embodiment which differs from that of the weatherstrip assembly as described above mainly by how the retaining segment 23 is configured which now features a curved second contact surface area 26 so that it snags the second hook section 42 in thus contributing towards an effective positive connection between the second hook section 42 and retaining segment 23.

Figure 5:
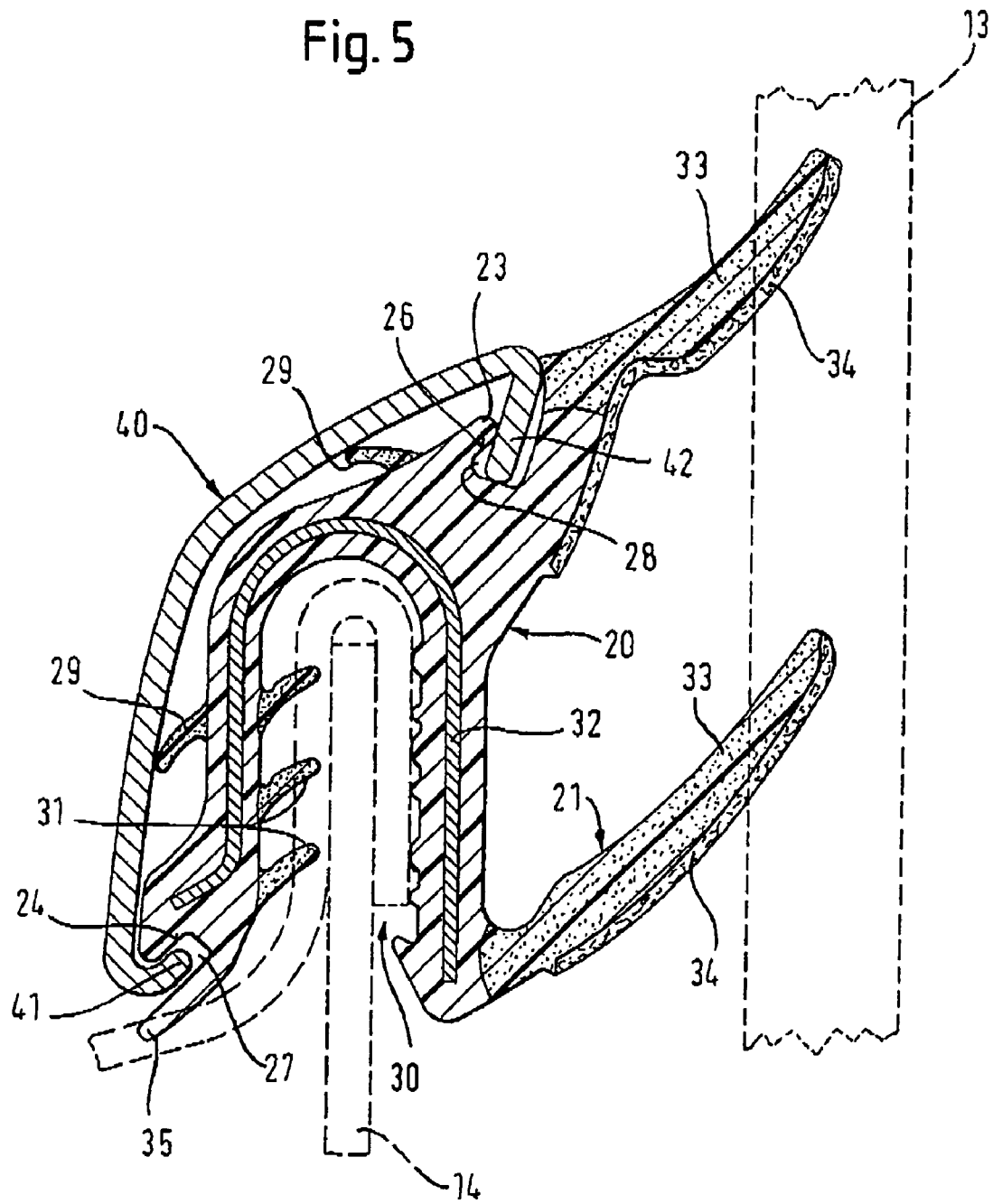
FIG. 5 is a cross-section through a third embodiment of a weatherstrip assembly in accordance with the invention.

Referring now to FIG. 5 there is illustrated a further embodiment of the weatherstrip assembly in which the retaining segment 23 is configured as an elastically deformable lip for relatively facilitated positive connection to the second hook section 42.

The embodiments as described above are characterized by a relatively low force as needed for securing the trim strip 40 to the weatherstrip 20. The main reason for this is the retaining segment 23 being pivotable from the first position I into the second position 11 in counteracting a restoring force. The retaining segment 23 permits simultaneous positive and non-positive connection of the trim strip 40 and fastener section 22 in satisfying the demands for a relatively high withdrawal force and a tolerance in keeping with production requirements. On top of this, the hook sections 41, 42 permit a relatively low-profile configuration of the trim strip 40 in thus achieving enhanced visual appeal. Last but not least, the retaining lip 35 likewise contributes towards the visual appeal by compensating tolerances between the trim strip 40 and flange 14.

What is claimed:

1. A weatherstrip assembly to seal a window pane of a motor vehicle, comprising:
   a weatherstrip comprising a sealing section and a fastener section;
   a trim strip positively connected to said fastener section;
   said trim strip having at one end a first hook section and at the other end a second hook section;
   said fastener section comprising a first contact surface area for said first hook section, a second contact surface area for said second hook section, a retaining segment defining said second contact surface area and pivotable from a first position to a second position against the effect of a restoring force, and a recess adjoining said retaining segment;
   said first hook section latching to said first contact surface area and said second hook section being in positive contact with said second contact surface area; and
   said retaining segment is configured to be pivotable by said second hook section from said first position into said second position when latching said first hook section to said first contact surface area.

2. The weatherstrip assembly as set forth in claim 1, wherein said second contact surface area is opposite said recess.

3. The weatherstrip assembly as set forth in claim 2, wherein said second contact surface area is configured curved.

4. The weatherstrip assembly as set forth in claim 3, wherein said second contact surface area is formed by a recess in said fastener section.

5. The weatherstrip assembly as set forth in claim 1, wherein said first contact surface area is formed by a recess in said fastener section.

6. The weatherstrip assembly as set forth in claim 1, further comprising a body part to which said fastener section is secured.

7. The weatherstrip assembly as set forth in claim 6, wherein said fastener section has an approximately U-shaped cross-section for mounting on a flange of said body part.

8. The weatherstrip assembly as set forth in claim 1, wherein said fastener section is strengthened by a carrier.

9. The weatherstrip assembly as set forth in claim 8, wherein said carrier is made of metal.

10. The weatherstrip assembly as set forth claim 1, wherein said trim strip is made of plastics or metal.

11. The weatherstrip assembly as set forth in claim 1, wherein said weatherstrip is extruded from an elastomer.

12. The weatherstrip assembly as set forth in claim 11, wherein said elastomer is a thermoplastic elastomer or ethylene propylene diene monomer.

13. A weatherstrip assembly to seal a window pane of a motor vehicle, comprising:
   a weatherstrip comprising a sealing section and a fastener section;
   a trim strip positively connected to said fastener section;
   said trim strip having at one end a first hook section and at the other end a second hook section;
   said fastener section comprising a first contact surface area for said first hook section, a second contact surface area for said second hook section, a retaining segment defining said second contact surface area and pivotable from a first position to a second position against the effect of a restoring force, and at least one supporting lip for supporting said trim strip, said supporting lip disposed between said first contact surface area and said second contact surface area and configured to produce a tensioning force which urges said first hook section against said first contact surface area and said second hook section against said second contact surface area;
   said first hook section latching to said first contact surface area and said second hook section being in positive contact with said second contact surface area; and
   said retaining segment is configured to be pivotable by said second hook section from said first position into said second position when latching said first hook section to said first contact surface area.

14. The weatherstrip assembly as set forth in claim 13, wherein said second contact surface area is opposite said recess.

15. The weatherstrip assembly as set forth in claim 14, wherein said second contact surface area is configured curved.

16. The weatherstrip assembly as set forth in claim 13, wherein said first contact surface area is formed by a recess in said fastener section.

17. The weatherstrip assembly as set forth in claim 13, further comprising a body part to which said fastener section is secured.

18. The weatherstrip assembly as set forth in claim 17, wherein said fastener section has an approximately U-shaped cross-section for mounting on a flange of said body part.

19. The weatherstrip assembly as set forth in claim 13, wherein said fastener section is strengthened by a carrier.

20. The weatherstrip assembly as set forth in claim 19, wherein said carrier is made of metal.

21. The weatherstrip assembly as set forth claim 13, wherein said trim strip is made of plastics or metal.

22. The weatherstrip assembly as set forth in claim 13, wherein said weatherstrip is extruded from an elastomer.

23. The weatherstrip assembly as set forth in claim 22, wherein said elastomer is a thermoplastic elastomer or ethylene propylene diene monomer.

24. The weatherstrip assembly as set forth in claim 13, wherein said second contact surface area is formed by a recess in said fastener section.

* * * * *